(12) United States Patent
Sloop

(10) Patent No.: US 8,497,030 B2
(45) Date of Patent: Jul. 30, 2013

(54) RECYCLING BATTERIES HAVING BASIC ELECTROLYTES

(76) Inventor: Steven E. Sloop, Bend, OR (US)

( * ) Notice: Subject to any disclaimer, the term of this patent is extended or adjusted under 35 U.S.C. 154(b) by 770 days.

(21) Appl. No.: 12/510,947

(22) Filed: Jul. 28, 2009

(65) Prior Publication Data

US 2009/0286137 A1    Nov. 19, 2009

Related U.S. Application Data

(60) Continuation-in-part of application No. 11/731,093, filed on Mar. 29, 2007, which is a division of application No. 10/340,358, filed on Jan. 9, 2003, now Pat. No. 7,198,865.

(60) Provisional application No. 61/084,220, filed on Jul. 28, 2008.

(51) Int. Cl.
| | | |
|---|---|---|
| *H01M 10/44* | (2006.01) | |
| *H01M 6/50* | (2006.01) | |
| *H01M 10/42* | (2006.01) | |
| *H01M 2/36* | (2006.01) | |
| *H01M 2/12* | (2006.01) | |
| *B03D 1/02* | (2006.01) | |
| *B03D 1/004* | (2006.01) | |

(52) U.S. Cl.
USPC .............. 429/49; 429/95; 429/53; 429/50; 209/167; 209/166

(58) Field of Classification Search
None
See application file for complete search history.

(56) References Cited

U.S. PATENT DOCUMENTS

| | | | |
|---|---|---|---|
| 2,829,188 A * | 4/1958 | Coleman et al. | 429/115 |
| 5,185,564 A | 2/1993 | Miller | |
| 5,575,907 A | 11/1996 | Lindermann | |
| 5,847,538 A | 12/1998 | Yoshimatsu | |
| 5,856,738 A | 1/1999 | Yoshimatsu | |
| 5,888,463 A | 3/1999 | McLaughlin et al. | |
| 6,080,508 A | 6/2000 | Dasgupta et al. | |
| 6,176,895 B1 | 1/2001 | DeSimone et al. | |
| 6,273,921 B1 * | 8/2001 | Stanford et al. | 29/623.1 |
| 6,284,412 B1 | 9/2001 | Minakata et al. | |
| 6,329,096 B2 * | 12/2001 | Kawakami et al. | 429/49 |
| 6,447,669 B1 | 9/2002 | Lain | |
| 6,511,639 B1 | 1/2003 | Schmidt et al. | |
| 6,524,737 B1 * | 2/2003 | Tanii et al. | 429/49 |
| 6,844,103 B2 | 1/2005 | Lee et al. | |

(Continued)

FOREIGN PATENT DOCUMENTS

| | | |
|---|---|---|
| EP | 1056146 | 11/2000 |
| WO | 0223651 | 3/2002 |
| WO | WO 0223651 A1 * | 3/2002 |

OTHER PUBLICATIONS

ISA United States Patent Office; International Search Report of PCT/US2009/052000; Sep. 22, 2009; United States.

(Continued)

*Primary Examiner* — Barbara Gilliam
*Assistant Examiner* — Angela Martin
(74) *Attorney, Agent, or Firm* — Alleman Hall McCoy Russell & Tuttle LLP

(57) ABSTRACT

Embodiments related to recycling alkaline batteries are disclosed. In one disclosed embodiment, a method for recycling a battery having a basic electrolyte comprises rupturing the battery under anaerobic conditions and flooding the interior of the battery with carbon dioxide in an anaerobic chamber.

10 Claims, 4 Drawing Sheets

U.S. PATENT DOCUMENTS

| | | |
|---|---|---|
| 7,713,396 B2 | 5/2010 | Kakuta et al. |
| 2003/0186110 A1 | 10/2003 | Sloop |
| 2007/0196725 A1 | 8/2007 | Tedjar et al. |
| 2009/0120170 A1* | 5/2009 | Carbonell et al. ........... 73/61.59 |

OTHER PUBLICATIONS

Fu et al. "Syntheses of Conductive Polypyrrole/Polyurethane Foams via a Supercritical Fluid Process." Macromolecules; vol. 30, pp. 7611-7613. 1997.

Contestabile et al. "A Laboratory-Scale Lithium-Ion Battery Recycling Process." Journal of Power Sources; vol. 92, pp. 65-69. 2001.

Sloop et al. "Chemical Reactivity of PF5 and LiPF6 in Ethylene Carbonate/Dimethyl Carbonate Solutions." Electrochemical and Solid-State Letters; vol. 4, No. 4, pp. A42-A44. 2001.

Sloop et al. "The Role of Li-Ion Battery Electrolyte Reactivity in Performance Decline and Self-Discharge." Journal of Power Sources; vols. 119-121, pp. 330-337. 2003.

* cited by examiner

US 8,497,030 B2

RECYCLING BATTERIES HAVING BASIC ELECTROLYTES

CROSS REFERENCE TO RELATED APPLICATIONS

The present application claims priority to U.S. Provisional Application 61/084,220, filed on Jul. 28, 2008 and entitled RECYCLING BATTERIES HAVING BASIC ELECTROLYTES, the entirety of which is hereby incorporated by reference herein for all purposes. The present application is also a continuation-in-part of and claims priority to U.S. patent application Ser. No. 11/731,093, filed Mar. 29, 2007, which is a divisional of U.S. patent application Ser. No. 10/340,358, filed Jan. 9, 2003, now U.S. Pat. No. 7,198,865, entitled SYSTEM AND METHOD FOR REMOVING AN ELECTROLYTE FROM AN ENERGY STORAGE AND/OR CONVERSION DEVICE, naming Steven E. Sloop as inventor, the entire contents of each of which are incorporated herein by reference for all purposes.

TECHNICAL FIELD

The present application relates to the fields of storage-battery recycling and metals recovery.

BACKGROUND

Every battery has a finite life cycle, beyond which its ability to store and deliver charge is significantly reduced. The life cycle of a modem, rechargeable battery, e.g., a nickel metal hydride (NiMH) battery, may include hundreds of charge/discharge phases, while that of a common alkaline battery has only one discharge phase. At the end of the life cycle, the material constituents of the battery remain present, even though chemical and structural changes have reduced their ability to store and deliver charge. Recycling a battery at this stage may offer economic, safety-related, and environmental benefits.

Such benefits may derive from the fact that at least some of the material constituents of the battery—metals, especially—may be less expensive and less environmentally disruptive to recycle than to garner from raw materials. Further, some battery constituents may be toxic and/or unsuitable for disposal in a sanitary landfill or sewer system. Further still, the internal constituents of some batteries—NiMH batteries, for example—may be air sensitive and may pose a fire hazard if included in a generic waste stream.

With increasing world-wide proliferation of batteries, driven by a demand for consumer-electronic devices and for device portability, and with battery-powered vehicles entering the transportation sector, the various benefits of battery recycling are further amplified.

SUMMARY

Therefore, a series of methods for recycling a battery having a basic electrolyte are disclosed herein. One such method comprises rupturing the battery under anaerobic conditions and flooding the interior of the battery with carbon dioxide in an anaerobic chamber.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The term 'battery' is applied herein to an electrochemical galvanic cell comprising an anode, a cathode and an intervening electrolyte. It is applied equally to a plurality of such cells configured in parallel and/or in series and sharing a common enclosure.

Figure 1:
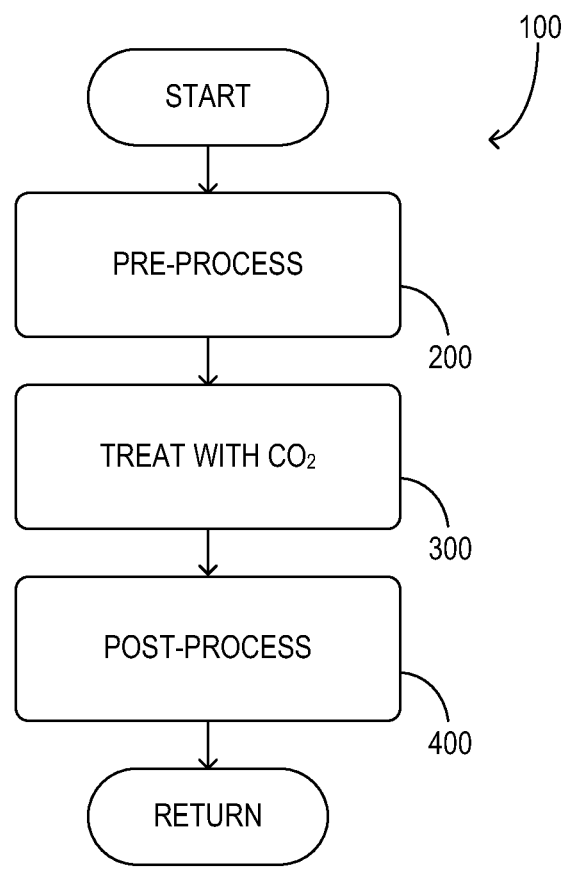
FIG. 1 illustrates a method for battery recycling in accordance with an embodiment of the present disclosure.

FIG. 1 shows example method 100 directed to the recycling of batteries having basic (pH>7) electrolytes. Example batteries of this class may include common alkaline cells (e.g., AA, AAA, C, and D cells), NiMH cells, and multi-cell batteries of either type. Such batteries may contain aqueous, hydroxide-based electrolytes: solutions comprising group IA hydroxides (e.g., LiOH), or quaternary ammonium hydroxides (e.g., tetra-n-butylamonium hydroxide), as examples. Such batteries may be used to power consumer-electronic devices (cameras, cell phones, computers, etc.), portable electric appliances (tools, toothbrushes, vacuum cleaners, etc.), and vehicles (electric bicycles, hybrid and fully electric automobiles, etc.), for example.

Figure 2:
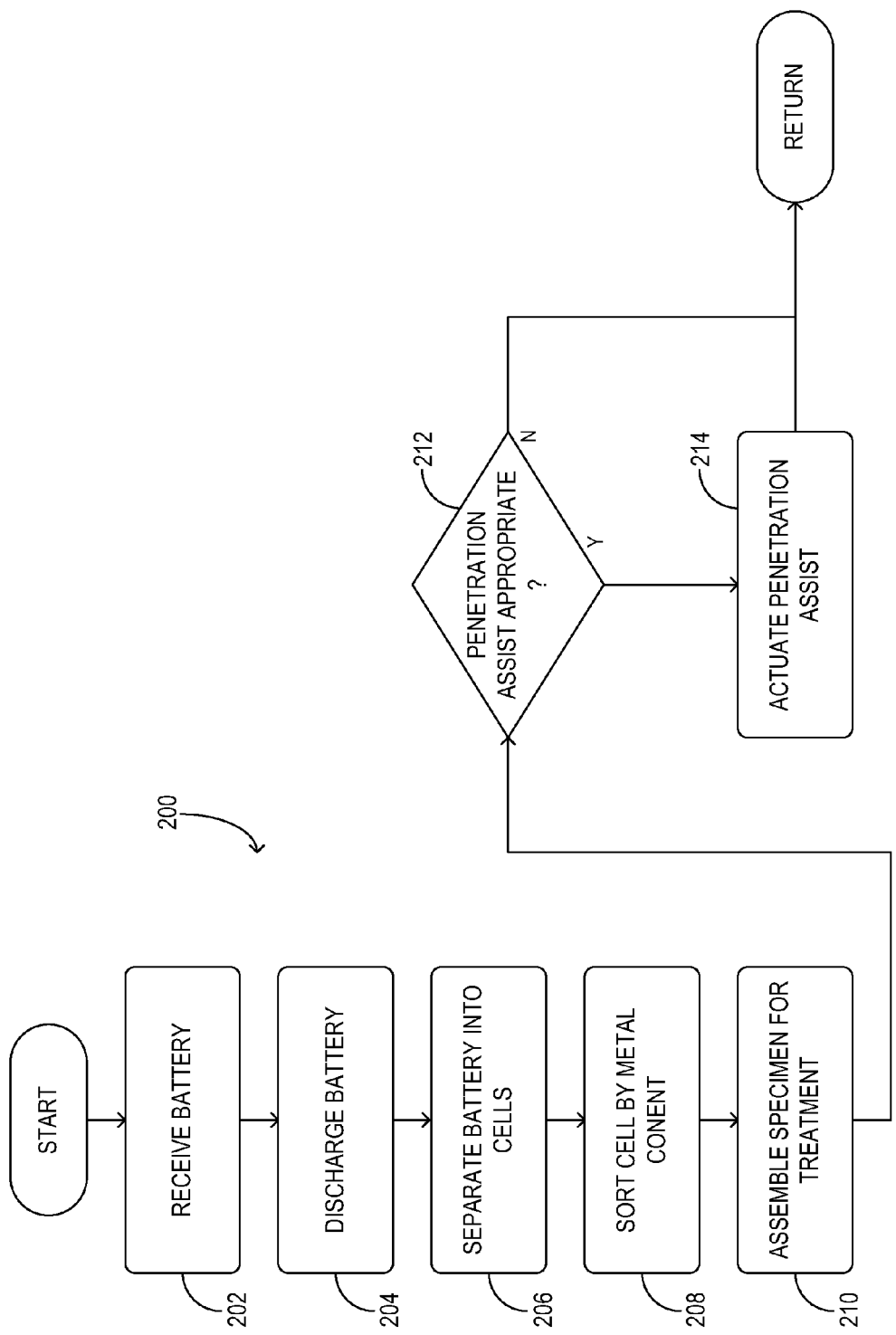
FIG. 2 shows a pre-processing method for battery recycling in accordance with an embodiment of the present disclosure.

Method 100 begins with pre-processing method 200, further described in FIG. 2. It continues to $CO_2$ treatment method 300, further described in FIG. 3, and then to post-processing method 400, further described in FIG. 4.

FIG. 2 shows a pre-processing method 200 in one example embodiment. The method begins at 202, where a battery having a basic electrolyte is received. The battery may be received in any charge state ranging from fully discharged to fully charged. The charge state of the battery may be assayed, in one embodiment, by connecting a resistive load across the terminal electrodes of the battery and measuring the current flowing through the resistive load. If the assay reveals that the battery is not fully discharged, then at 204, a resistive load (the same or different than the one used in the assay) may be connected across the terminal electrodes of the battery for such time as to ensure complete discharge.

Some multi-cell batteries, such as those used in hybrid and fully electric automobiles, may be configured for facile separation into individual cells. For batteries so configured, the cells, at 206, may be separated from each other. Separation of cells in the pre-processing method may increase the efficiency of subsequent treatment method 300 by allowing $CO_2$ to more rapidly reach the internal components of the cells. Moreover, separation of a multi-cell battery into individual cells may enable more efficient packing of the cells in the pressure vessel used in treatment method 300, as described below.

Continuing in FIG. 2, method 200 advances to 208, where the battery, or separated cells from the battery, are sorted into bins based on the metals they are believed to contain and/or not contain. Thus, in one embodiment, nickel-containing cells may be binned together. In another embodiment, cells containing both nickel and manganese may be binned together and segregated from cells containing nickel, but no manganese. It will be appreciated by those skilled in the art that a virtually unlimited number of sorting strategies are possible, and that the chosen strategy may depend on the distribution of the different types of batteries received, the values of the recovered metals, and the degree to which those values are reduced when the metals are cross-contaminated.

Method 200 then advances to 210, where a specimen of batteries and/or separated battery cells from the same or equivalent bins is assembled for subsequent treatment. The size of the specimen may be chosen based on the capacity of the pressure vessel used in treatment method 300.

Method 200 then advances to 212, where it is determined whether any form of penetration assist is appropriate for any of the batteries and/or cells in the specimen. The term 'penetration assist' is applied herein to any action taken to accelerate the penetration of a fluid into a battery or cell, such as a penetration of $CO_2$ during treatment method 300. A penetration assist may comprise rupturing the battery under anaerobic conditions—either mechanically or chemically (e.g., with the aid of a solvent). In one embodiment, the penetration assist may include drilling or poking one or more small holes through a wall of a battery or cell of a battery in order to increase the rate at which $CO_2$ may penetrate the cell. In another embodiment, the penetration assist may involve removing a sealing screw or screw-thread cap, or opening a valve to expose the internal contents of the cell. In these and other embodiments, the penetration assist may be enacted under anaerobic conditions.

As used herein, 'anaerobic conditions' signify an environment having a significantly reduced partial pressure of oxygen relative to that of ordinary air. More particularly, anaerobic conditions are conditions where the oxygen content is too low to support combustion of the various spontaneously inflammable materials typically found in batteries-lithium-containing anode materials, for example. Nevertheless, some small but measurable amount of oxygen may be present under such anaerobic conditions, which include but are not limited to environments where all oxygen is rigorously excluded. In the context of the preset disclosure, anaerobic conditions include environments where the air in a vessel has been displaced by another gas such as nitrogen or $CO_2$, or by a liquid having a suitably low concentration of dissolved oxygen. Such a vessel is referred to herein as an 'anaerobic chamber.'

Continuing in FIG. 2, the penetration assist considered at 212 may in some instances be appropriate because it would increase the overall efficiency of the treatment method, because it can be accomplished easily, safely, inexpensively, etc. In other instances, the penetration assist may not be appropriate because it is unessential, marginally useful, difficult, hazardous, or expensive to accomplish. If it is determined that a penetration assist is appropriate, then at 214, the penetration assist is enacted. Method 200 then returns, after enacting the penetration assist or when it is determined that the penetration assist is not appropriate.

Figure 3:
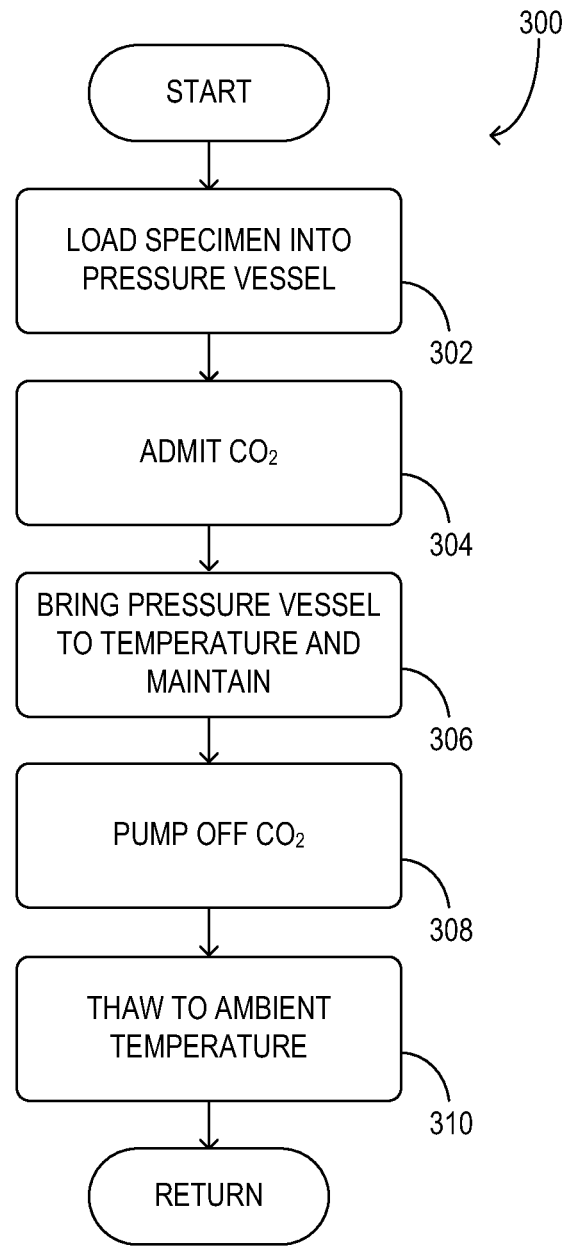
FIG. 3 illustrates a method for treatment of spent batteries with carbon dioxide ($CO_2$) in accordance with an embodiment of the present disclosure.

FIG. 3 illustrates a method 300 for treatment of spent batteries with $CO_2$ in one example embodiment. The method begins at 302, where a specimen comprising spent batteries is loaded into a pressure vessel. The specimen may be supported on a palette for ease of loading into and/or unloading from the pressure vessel. In some embodiments, the palette may include a sieve, screen, mesh, or filter so that the solid components of the treated specimen may be separated easily from the liquid components after the treatment method is competed.

Method 300 then advances to 304, where $CO_2$ is admitted into the pressure vessel from any suitable $CO_2$ source, whether stationary or mobile. In some embodiments, the source may include a pressurized and/or refrigerated tank, from which the $CO_2$ is supplied as a liquid or as a gas. Accordingly, the admission of $CO_2$ may flood the interiors of the batteries and cells in the specimen. In some embodiments, flooding may be enabled or accelerated by the penetration assist enacted at 214. In other embodiments, exposing the battery to $CO_2$ may itself cause the battery to rupture and become flooded with $CO_2$.

The $CO_2$ may be admitted to the pressure vessel through a valve, a regulator, or series of valves and/or regulators. In some embodiments, the $CO_2$ may be actively pumped into the pressure vessel so that the pressure of the $CO_2$ inside the pressure vessel is greater than that of the source. In some embodiments, the $CO_2$ may be chilled before and/or upon admission to the pressure vessel. In some embodiments, the $CO_2$ may be solidified before and/or upon admission to the pressure vessel. In these and other embodiments, the admission of the $CO_2$ may effectively displace the air that was formerly present in the pressure vessel, such that the environment within the pressure vessel is anaerobic.

Method 300 then advances to 306, where the pressure vessel and its contents are isolated from the source and from the atmosphere—by closing one or more valves of the pressure vessel, for example. The contents of the pressure vessel are then heated and/or allowed to warm to a set-point temperature and a set-point pressure. In some embodiments, the contents of the pressure vessel are maintained at the set-point temperature and set-point pressure for a predetermined period of time while the interior of the battery is flooded with $CO_2$. In one, non-limiting embodiment, the predetermined set-point temperature may be ambient temperature, and the predetermined period of time may be eight to twelve hours. In other embodiments, the set-point temperature and/or set-point pressure may be varied according to a predetermined program or schedule.

Whether maintained at a constant value or varied according to a program, the set-point temperature and set-point pressure may be such that at least some of the $CO_2$ in the pressure vessel is in the form of a supercritical fluid during some part of treatment method 300. In other embodiments, the set-point temperature and set-point pressure may be such that at least some of the $CO_2$ in the pressure vessel is in the form of a liquid during some part of the treatment method. In still other embodiments, at least some of the $CO_2$ in the pressure vessel may be in the form of a supercritical fluid during one part of the treatment method, and in the form of a liquid during another part of the treatment method.

During such treatment of the specimen, $CO_2$ may dissolve or swell some structure-providing components of the batteries and cells of the specimen, thus breeching the cell structure and flooding the internal components of the cells. Further, flooding the interior of the batteries with $CO_2$ may cause the $CO_2$ to react chemically with (e.g., to neutralize) the basic electrolyte. When $CO_2$ comes in contact with the electrolytes of the cells, for example, hydroxides in the electrolyte may be consumed, e.g., $$OH^- + CO_2 \rightarrow HCO_3^-. \tag{1}$$

In cases where one or more batteries in the specimen comprises a hydridic solid, flooding the interior of the battery with $CO_2$ may cause the $CO_2$ to react chemically with (e.g., to oxidize) the hydridic solid. For example, in the presence of excess $CO_2$, hydrolytic passivation of NiMH anodes may take place, e.g., $$(H^-)+CO_2+H_2O \rightarrow H_2+HCO_3^-. \quad (2)$$

In cases where one or more batteries in the specimen comprises a disordered oxyhydroxide solid, flooding the interior of the battery with $CO_2$ may convert at least some of the disordered oxyhydroxide solid to a more ordered oxyhydroxide solid. For example, suspension in $CO_2$ may support a conversion of the disordered α phase of nickel(III) oxyhydroxide (an anode material in NiMH batteries) to the more electroactive β phase, $$\alpha\text{-NiO(OH)} \rightarrow \beta\text{-NiO(OH)}. \quad (3)$$

In such embodiments, the set-point temperature and pressure and the predetermined period of time chosen at 306 may be particularly chosen so as to enable a disordered oxyhydroxide solid present in the specimen to convert to a more ordered oxyhydroxide solid.

By inference, redox reactions as represented in eq 2 may occur to some degree even if all the NiMH cells in the specimen were fully discharged (as could be enacted step 204, for example). Portions of the anode material may separate from the anode and/or lose contact with the electrolyte while the battery is in use, thus isolating redox-active material contained within these portions. Such separation is one failure mode of NiMH batteries, and is a reason why such batteries remain spontaneously inflammable even when fully discharged.

The transformations shown in the above chemical equations point to significant advantages of treatment method 300. With respect to eq 1, caustic hydroxides from the electrolyte are converted to non-caustic bicarbonate salts. Thus, the indicated transformation may make the treated specimen safer to handle for workers, and may reduce the cost of equipment needed to handle it. The same transformation may further reduce the complexity of waste-stream processing that would be needed if electrolyte-derived components of the treated specimen were to be discharged into a sewer or sanitary landfill.

With respect to eq 2, hydrolytic passivation (e.g., oxidative hydrolysis) in $CO_2$ is believed to be a uniquely safe and effective way to defeat the spontaneous inflammability of NiMH anodes. The methods described herein hydrolyze the anodes in an anaerobic environment, where the evolved hydrogen cannot unite explosively with oxygen, and, in a pressure vessel adequately configured to accommodate the pressure increase caused by the hydrogen.

With respect to eq 3, the dehydrating ability of $CO_2$ is believed to provide a driving force for the indicated allotropic conversion, as water molecules are known to situate between crystalline NiO(OH) planes in the disordered α phase, but not in the ordered β phase. Thus, treatment method 300 not only provides recycling of spent battery materials, but also conversion of a less readily usable material to a more readily usable material.

Continuing in FIG. 3, method 300 advances to 308, where the $CO_2$ is removed from the pressure vessel. In some embodiments, $CO_2$ gas may be actively pumped from the pressure vessel to another container and optionally liquefied. In other embodiments, it may be vented to the atmosphere. This action may further comprise releasing from the pressure vessel any hydrogen formed when the various hydridic solids that may be present in the specimen are oxidatively hydrolyzed.

The action of removing $CO_2$ from the pressure vessel may chill the pressure vessel and its contents such that an aqueous phase from the treated specimen freezes. Thus, at 310, the contents of the pressure vessel are thawed to ambient temperatures to allow separation of a solid, metal-containing residue from a thawed aqueous phase. Following 310, method 300 returns.

Figure 4:
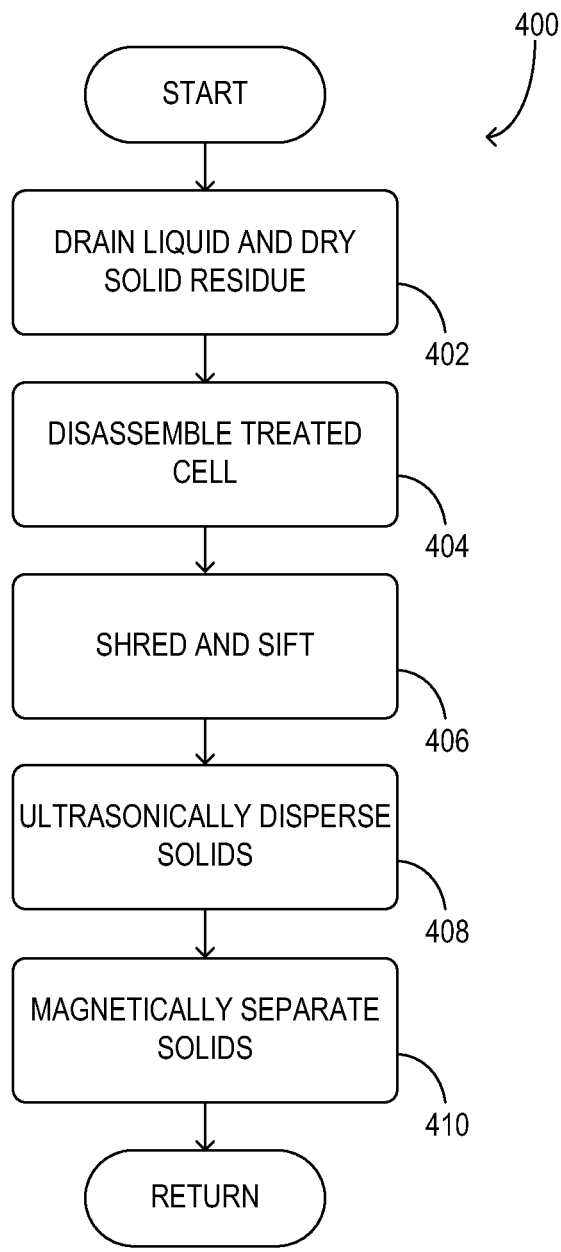
FIG. 4 shows a post-processing method for battery recycling in accordance with an embodiment of the present disclosure.

FIG. 4 shows a post-processing method 400 in one example embodiment. The method begins at 402, where liquid that may be present in the pressure vessel after thawing is drained. The liquid may include an aqueous phase containing various bicarbonate salts and other soluble salts that may have been present in the specimen prior to treatment.

Method 400 then advances to 404, where batteries and/or cells present in the solid residue after treatment of the specimen are disassembled. The disassembly may include automated and/or robotically enacted disassembly steps. Then, at 406, the treated specimen is subject to a shred-and-sift procedure, where the solid residue is mechanically shredded until the constituents are fine enough to pass through a screen or series of screens.

In some embodiments, at least some of the solid residue may be further dispersed. Accordingly, method 400 advances to 408, where the treated specimen or some fraction thereof is ultrasonically dispersed to further reduce the particle size of the solids therein. In some embodiments, the ultrasonic dispersal may be conducted on solid residues suspended in a liquid. Then, in any suitable manner, the solid residues may be collected and allowed to dry.

Additional embodiments may include separating a first solid in the residue from at least a second solid in the residue based on a differing magnetic property of the first solid relative to the second solid. Accordingly, method 400 advances to 410, where the specimen is subject to magnetic separation. This step may involve passing a pulverized solid residue from the treated specimen between or near the poles of a permanent magnet or an electromagnet. In other embodiments, a suspension of a pulverized solid residue in a liquid may be passed between or near the poles of a magnet. Magnetic separation may be used to separate a ferromagnetic anode material from a NiMH-battery from non-ferromagnetic battery constituents, which may include forms of the nickel oxyhydroxide cathode material. Following 410, method 400 returns.

It will be appreciated that the approaches disclosed herein are exemplary in nature and should not be considered in a limiting sense, because numerous variations are contemplated. Some of the process steps described and/or illustrated herein may in some embodiments be omitted without departing from the scope of this disclosure. Likewise, the indicated method of the process steps may not always be required to achieve the intended results, but is provided for ease of illustration and description. Further, it will be appreciated that the subject matter of the present disclosure includes all novel and non-obvious combinations and sub-combinations of the various methods and other features disclosed herein, as well as any and all equivalents thereof.

The invention claimed is:

1. A method for recycling a battery having a basic electrolyte and a disordered oxyhydroxide solid, the method comprising:
   rupturing the battery under anaerobic conditions; and
   flooding an interior of the battery with carbon dioxide in an anaerobic chamber to convert at least some of the disordered oxyhydroxide solid to a more ordered oxyhydroxide solid.

2. The method of claim 1, where exposing the battery to the carbon dioxide causes the battery to rupture.

3. The method of claim 1, where rupturing the battery comprises mechanically rupturing the battery.

4. The method of claim 1, where flooding the interior of the battery with carbon dioxide includes causing the carbon dioxide to reduce an alkalinity of the basic electrolyte.

5. The method of claim 1, where the battery comprises a hydridic solid, and where flooding the interior of the battery with carbon dioxide includes causing the carbon dioxide to react chemically with the hydridic solid.

6. The method of claim 1, further comprising subjecting the battery to predetermined temperature and pressure for a predetermined period of time while the interior of the battery is flooded with the carbon dioxide.

7. The method of claim 1, further comprising separating the battery into a plurality of cells before flooding the interior of the battery with the carbon dioxide.

8. The method of claim 7, further comprising mechanically rupturing one or more of the plurality of cells.

9. The method of claim 1, where flooding the interior of the battery with carbon dioxide yields a solid residue, the method further comprising collecting the solid residue, allowing the solid residue to dry, and dispersing the collected, dried solid residue.

10. The method of claim 1, where flooding the interior of the battery with carbon dioxide yields a solid residue, the method further comprising collecting the solid residue, and separating an anode material in the solid residue from at least a cathode material in the solid residue based on a differing magnetic property of the anode material relative to the cathode material.

* * * * *